United States Patent [19]

Kelley et al.

[11] Patent Number: 5,498,027
[45] Date of Patent: Mar. 12, 1996

[54] SEAMLESS DOOR FOR AIR BAG MODULE

[75] Inventors: Scott A. Kelley, Algonac; Andrew J. Smydra, Rochester, both of Mich.

[73] Assignee: TRW Vehicle Safety Systems Inc., Lyndhurst, Ohio

[21] Appl. No.: 333,711

[22] Filed: Nov. 3, 1994

[51] Int. Cl.⁶ .................................................. B60R 21/20
[52] U.S. Cl. ........................................ 280/728.3; 280/732
[58] Field of Search ................................ 280/728 B, 732, 280/752, 730 R, 728 A, 728 R, 731, 728.3, 732, 752, 730.1, 728.2, 728.1

[56] References Cited

U.S. PATENT DOCUMENTS

| | | | |
|---|---|---|---|
| 3,514,124 | 5/1970 | Richardson | 280/732 |
| 3,794,349 | 2/1974 | Fuller | 280/732 |
| 3,801,126 | 4/1974 | Knight, IV et al. | 280/732 |
| 3,966,227 | 6/1976 | Cameron | 280/752 |
| 4,893,833 | 1/1990 | DiSalvo et al. | 280/728 B |
| 4,925,209 | 5/1990 | Sakurai | 280/728 B |
| 5,116,079 | 5/1992 | Rhodes, Jr. | 280/728 B |
| 5,238,264 | 8/1993 | Barnes | 280/732 |
| 5,335,937 | 8/1994 | Uphues et al. | 280/728 B |

FOREIGN PATENT DOCUMENTS

| 4078637 | 3/1992 | Japan | 280/728 B |
|---|---|---|---|

Primary Examiner—Margaret A. Focarino
Assistant Examiner—Peter C. English
Attorney, Agent, or Firm—Tarolli, Sundheim & Covell

[57] ABSTRACT

A door assembly (40) for an air bag module (30) includes a door panel (42) supported for pivotal movement on a frame (46, 48) fixed to a vehicle (12). A body of foam material (50) includes a first portion (198) supported on the door panel (42) and a second portion (200, 202) supported on the frame (46, 48), interconnected by a frangible portion (206). A seamless skin (60) includes a first portion (214) covering the first foam portion (198) and a second portion (212) covering the second foam portion (200, 202). The first foam portion (198) moves with the door panel (42) when the deploying air bag (34) pivots the door panel open. The second foam portion (200, 202) remains on the frame (46, 48). The second portion (212) of the skin (60) peels away from the second foam portion (200, 202), without tearing, when the door panel (42) pivots open.

13 Claims, 3 Drawing Sheets

SEAMLESS DOOR FOR AIR BAG MODULE

BACKGROUND OF THE INVENTION

1. Technical Field

The present invention relates to a vehicle safety apparatus, and particularly relates to a door assembly for covering an opening through which an inflatable vehicle occupant restraint deploys.

2. Description of the Prior Art

It is known to protect a vehicle occupant with an inflatable restraint, such as an air bag, which inflates and deploys to restrain the vehicle occupant in the event of a vehicle collision. The air bag is stored in the vehicle in a folded condition behind a door assembly which conceals and protects the air bag. When the air bag is inflated, the force of the inflating air bag causes the door assembly to open to enable the air bag to deploy. It is desirable that the door assembly not have any visible seams, tear lines or other markings.

SUMMARY OF THE INVENTION

The present invention is an apparatus for covering an opening through which an inflatable vehicle occupant restraint is deployed. The apparatus includes a body of foam material and a skin covering the body of foam material. The body of foam material and the skin are supported in a first position covering the opening. Hinge means at a first side of the body of foam material supports a first portion of the body of foam material for pivoting movement from the first position covering the opening in response to deployment of the inflatable restraint. The skin has a terminal end portion at a second side of the body of foam material opposite the first side. The apparatus includes means for pulling the terminal end portion of the skin away from a second portion of the body of foam material upon deployment of the inflatable restraint.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
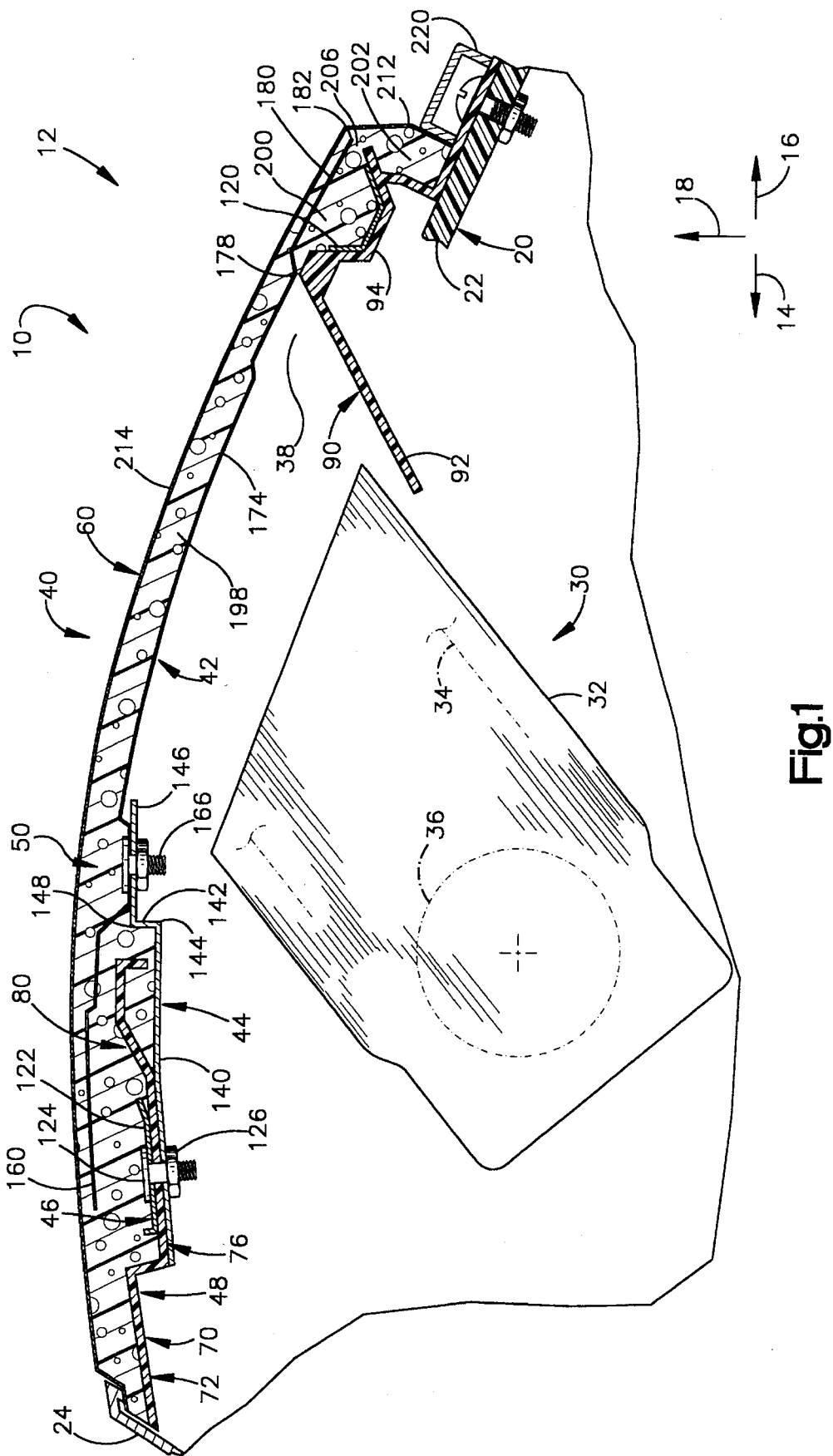
FIG. 1 is a schematic sectional view of a vehicle safety apparatus including a door assembly in accordance with the present invention shown in a closed condition.

The present invention relates to a vehicle safety apparatus for protecting an occupant of a vehicle in the event of a vehicle collision. The present invention is applicable to various vehicle safety apparatus constructions. As representative of the present invention, FIG. 1 illustrates a vehicle safety apparatus 10.

The vehicle safety apparatus 10 is located on the front passenger side of a vehicle 12. The forward direction of travel of the vehicle 12 is indicated by the arrow 14 and the rearward direction of travel of the vehicle is indicated by the arrow 16. A vertically upward direction in the vehicle 12 is indicated by the arrow 18.

The vehicle 12 includes an instrument panel 20, only portions of which are shown. The instrument panel 20 includes a rear portion 22 and a front portion 24. In the illustrated embodiment, the front portion 24 of the instrument panel forms a part of a diffuser or defroster outlet disposed under the windshield (not shown) of the vehicle.

The vehicle safety apparatus 10 includes an air bag module 30 which is supported on the vehicle instrument panel 20 in a manner not shown. The module 30 includes a housing 32 which encloses an air bag indicated schematically at 34 and an inflator indicated schematically at 36. The inflator 36 is a known inflator which, upon actuation, uses either gas generating material or stored gas or both to inflate the air bag 34 into a position to restrain a vehicle occupant. The air bag 34 is a known air bag which is folded and stored in a known manner in the housing 32. The air bag 34 deploys upward and rearward through an opening 38 in the vehicle instrument panel 20 into a position to restrain a vehicle occupant.

The opening 38 (FIG. 1) in the vehicle instrument panel 20 is covered by a door assembly 40. The door assembly 40 includes a door panel 42. A hinge 44 supports the door panel 42 on a frame 46 and a substrate 48. The door assembly 40 further includes a body of foam material 50 and a skin 60 covering the body of foam material.

Figure 4:
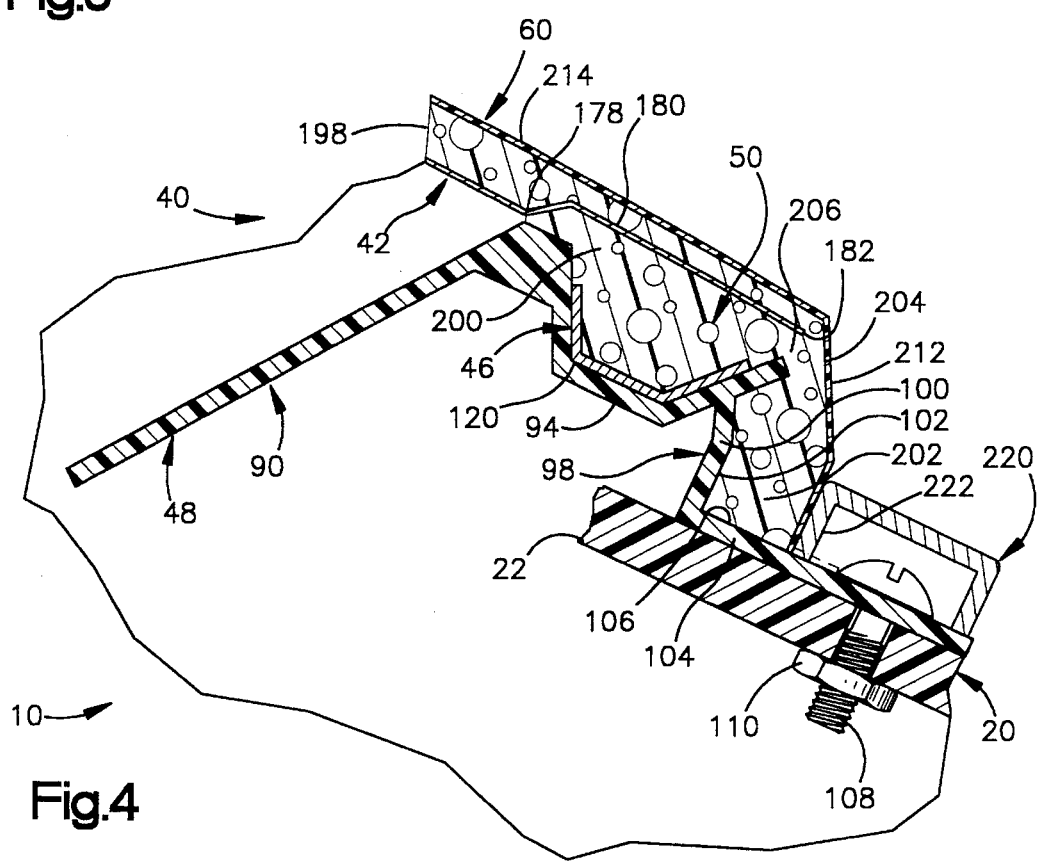
FIG. 4 is an enlarged view of a portion of the door assembly of FIG. 1.

The substrate 48 (FIGS. 1 and 4) extends around the opening 38 in the instrument panel 20 and at least partially defines the opening. The substrate 48 is preferably a one-piece plastic molding. The substrate 48 includes a front section 70 which has a portion 72 adjoining the diffuser outlet 24. The front section 70 of the substrate 48 extends forward of the diffuser outlet 24, and is secured to the firewall or cowl of the vehicle 12, in a manner not shown. A central portion 76 of the front section 70 extends rearward from the portion 72. A hook portion 80 extends rearward from the central portion 76 and defines the forward edge of the opening 38.

A rear section 90 of the substrate 48 disposed to the rear of the opening 38 includes an arm portion 92 and a channel portion 94 that extends rearward from the arm portion. An L-shaped rear leg portion 98 (FIG. 4) extends rearward from the channel portion 94 and includes a first leg 100 having an outer side surface 102 and a second leg 104 having an upper side surface 106. A plurality of screws 108 and nuts 110, one set of which is visible in FIG. 4, extend through the second leg 104 and secure the substrate 48 to the rear portion 22 of the vehicle instrument panel 20. The substrate 48 also includes side sections (not shown) which extend between the front and rear sections 70 and 90 on opposite (left and right as viewed in FIG. 3) sides of the opening 38 in the instrument panel 20.

The frame 46 (FIGS. 1 and 3) extends like a picture frame around the opening 38 in the instrument panel 20. The frame 46 is preferably made of sheet steel and is a reinforcement for the plastic substrate 48. The frame 46 has a rear section 120 which is disposed on the channel portion 94 of the rear section 90 of the substrate 48. A front section 122 of the frame 46 is disposed on the central portion 76 of the front section 70 of the substrate 48. A plurality of weld studs 124 and nuts 126, one set of which is visible in FIG. 1, secure the front section 122 of the metal frame 46 to the substrate 48 and to the hinge 44.

Figure 3:
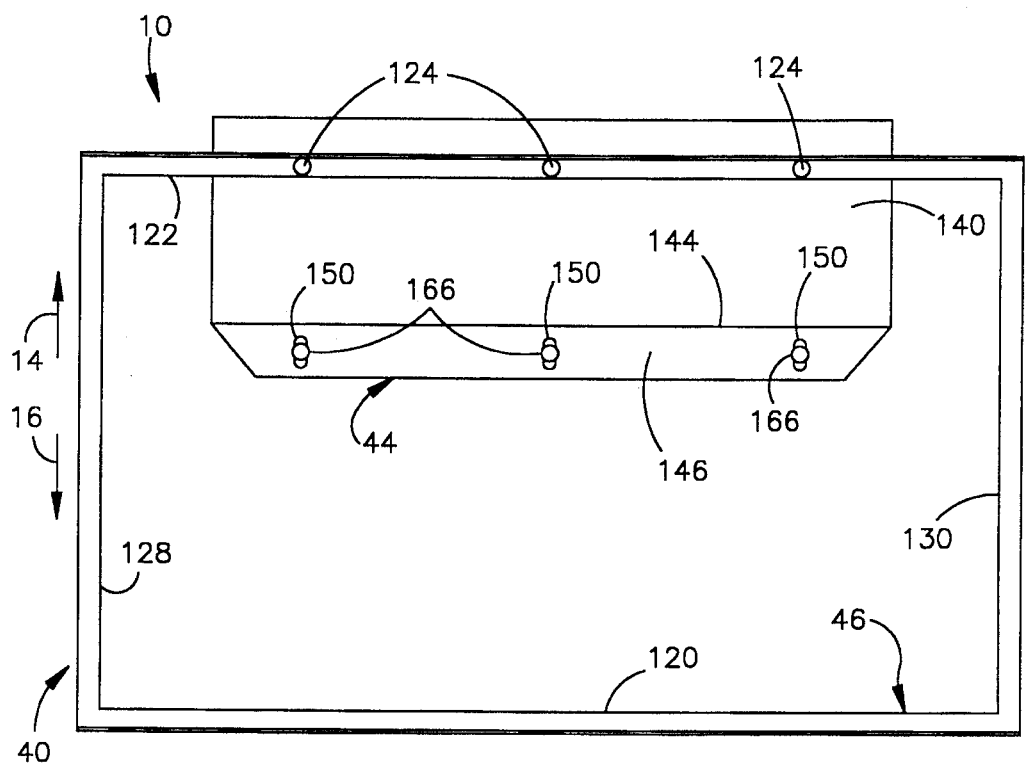
FIG. 3 is a schematic plan view of the door assembly of FIG. 1 with parts removed.

The frame 46 also includes an inner side section 128 and an outer side section 130 illustrated schematically in FIG. 3.

The frame side sections 128 and 130 are preferably attached to the substrate 48 in a manner not shown such as by fasteners like the weld studs and nuts 124 and 126.

The hinge 44 is one piece of material, preferably sheet steel. The hinge 44 extends laterally across the door assembly 40 in a direction between the inner side section 128 and the outer side section 130 of the frame 46. A first or forward portion 140 of the hinge 44 is disposed under the central portion 76 of the forward section 70 of the substrate 48. The first portion 140 of the hinge 44 is secured to the substrate 48 with the weld studs 124 and nuts 126. The hinge is bent at 144 to form a second portion 142 which extends perpendicular to and upward from the first portion 140. The hinge 44 is also bent at 148 to form a third portion 146 which extends rearward from the second portion 142 in a direction generally parallel to the first portion 140. A plurality of fastener openings 150 (FIG. 3) are formed in the third portion 146 of the hinge 44.

The door panel 42 is a rigid member preferably made from sheet steel. The door panel 42 could alternatively be made from plastic. The door panel 42 has a forward edge portion 160 (FIG. 2) disposed above the front section 122 of the frame 46. A hinge portion 162 of the door panel 42 extends rearward from the forward edge portion 160 and is disposed above the second portion 142 of the hinge 44. A connection portion 164 of the door panel 42 extends rearward from the hinge portion 162 and is connected with the third portion 146 of the hinge 44 by a plurality of fasteners 166 extending through the openings 150 in the hinge 44.

A main body portion 174 of the door panel 42 extends rearward from the connection portion 164. The main body portion 174 has an upper major side surface 176 and a lower major side surface 177. A bend line 178 (FIG. 2) separates the main body portion 174 of the door panel 42 from a rear edge portion 180 of the door panel. The rear edge portion 180 has a lower side surface 184 and terminates in a tip 182 of the door panel 42.

The body of foam material 50 (FIGS. 1 and 4) is preferably made from urethane foam which is foamed in place in the door assembly 40 in a manner described below. The body of foam material 50 is formed as one piece including the several contiguous portions 190–202 and 206 described below. The body of foam material 50 serves as a filler between the skin 60 and the door panel 42 and gives a final shape to the skin. The foam is resilient and acts as a cushion to provide softness to the door assembly 40.

One portion 190 (FIG. 2) of the body of foam material 50 is disposed above and overlies the portion 72 of the front section 70 of the substrate 48. Another portion 192 of the body of foam material 50 surrounds the forward edge portion 160 of the door panel 42 and overlies the central portion 76 of the front section 70 of the substrate 48. The foam portion 192 also overlies the front section 122 of the frame 46 and the weld stud 124.

Another portion 194 of the body of foam material 50 surrounds the hinge portion 162 of the door panel 42 and the hook portion 80 of the substrate 48. The foam portion 194 overlies the first portion 140 of the hinge 44. A further portion 196 of the body of foam material 50 overlies the connection portion 164 of the door panel 42 including the weld studs 166.

A portion 198 of the body of foam material 50 overlies and is in abutting engagement with the upper major side surface 176 of the main body portion 174 of the door panel 42. Another portion 200 of the body of foam material 50 is disposed in the channel portion 94 of the substrate 48 and overlies the rear section 120 of the frame 46. The rear edge portion 180 of the door panel 42 is embedded in the body of foam material 50 including the foam portions 198 and 200.

The forward edge of the foam portion 200 is separated from the foam portion 198 at the area between the bend line 178 of the door panel 42 and the rear section 90 of the substrate 48. A rearwardmost portion 202 of the body of foam material 50 is disposed outside (to the right as viewed in FIG. 4) of the first leg portion 100 of the substrate 48. The foam portion 202 has an outer side surface 204 which faces rearward in the direction 16.

The body of foam material 50 is frangible in the area indicated generally at 206 (FIGS. 1, 2 and 4), upon deployment of the air bag 34 as described below. The body of foam material 50 in the area 206 extends between and interconnects the foam portions 198, 200 and 202.

The skin 60 overlies the body of foam material 50. The skin 60 forms a visible part of the vehicle 12. The skin 60 is made from a plastic material, preferably urethane, with no seams, weakened areas, or break lines. The skin 60 is chemically bonded to the body of foam material 50 during the foaming in place process described below.

A front edge portion 210 of the skin 60 is disposed adjacent to the diffuser outlet 24. A rear edge portion or terminal end portion 212 of the skin 60 overlies the outer side surface 204 of the foam portion 202 and contacts the upper major side surface 106 of the second leg 104 of the substrate 48. A major portion 214 of the skin 60 extends between the front end portion 210 and the terminal end portion 212. The skin portion 214 overlies the foam portion 198 and the door panel 42.

An applique or trim piece 220 (FIG. 4) covers the mounting screws 108. The trim piece 220 has an upside down U-shaped cross-sectional configuration with an inner leg 222 disposed adjacent to the outer major side surface 204 of the foam portion 202. The terminal end portion 212 of the skin 60 extends between the inner leg 222 of the trim piece 220 and the outer major side surface 204 of the foam portion 202. In the preferred embodiment, the terminal end portion 212 of the skin 60 does not extend under the trim piece 220, and the screw 108 does not extend through the skin 60.

It should be understood that the substrate 48, the frame 46, the skin 60, and the body of foam material 50 all extend around the three sides (FIG. 3) of the opening 38 on which the hinge 44 is not connected. The skin 60 covers the entire door assembly 40. The terminal end portion 212 of the skin 60 extends for these three sides around the opening 38 and is bonded to the foam portion 202 along these three sides.

In manufacturing the door assembly 40, the metal frame 46 is connected with the substrate 48 and with the hinge 44. The interconnected frame 46, substrate 48 and hinge 44 are then set into one shell of a foaming tool (not shown). The skin 60 is placed on the other shell of the foaming tool. The foaming tool is closed, and foam is injected into the foaming tool. The foam is thereafter cured or set in a known manner. The skin 60 chemically bonds to the body of foam material 50. After the foam is cured, the door assembly 40 is removed from the tool.

The door assembly 40 is then connected with the vehicle 12 in the manner shown with fasteners including the illustrated fasteners 108 and 110. It is contemplated that the door assembly 40 could be manufactured as an integral portion of the vehicle instrument panel 20. For example, the body of foam material 50 might constitute a portion of the foam material which extends through the entire instrument panel of the vehicle 12, and the substrate 48 could be a portion of a substrate or other supporting structure of the vehicle instrument panel 20.

When the door assembly 40 is in the closed condition illustrated in FIG. 1, the major portion 214 of the skin 60 is adhered to the foam portion 198 overlying the upper major side surface 176 of the main body portion 174 of the door panel 42. The terminal end portion 212 of the skin 60 is adhered to the portion 202 of the body of foam material 50 which is disposed rearward of the first leg portion 100 of the substrate 48. The frangible portion 206 of the body of foam material 50 is not broken.

Figure 2:
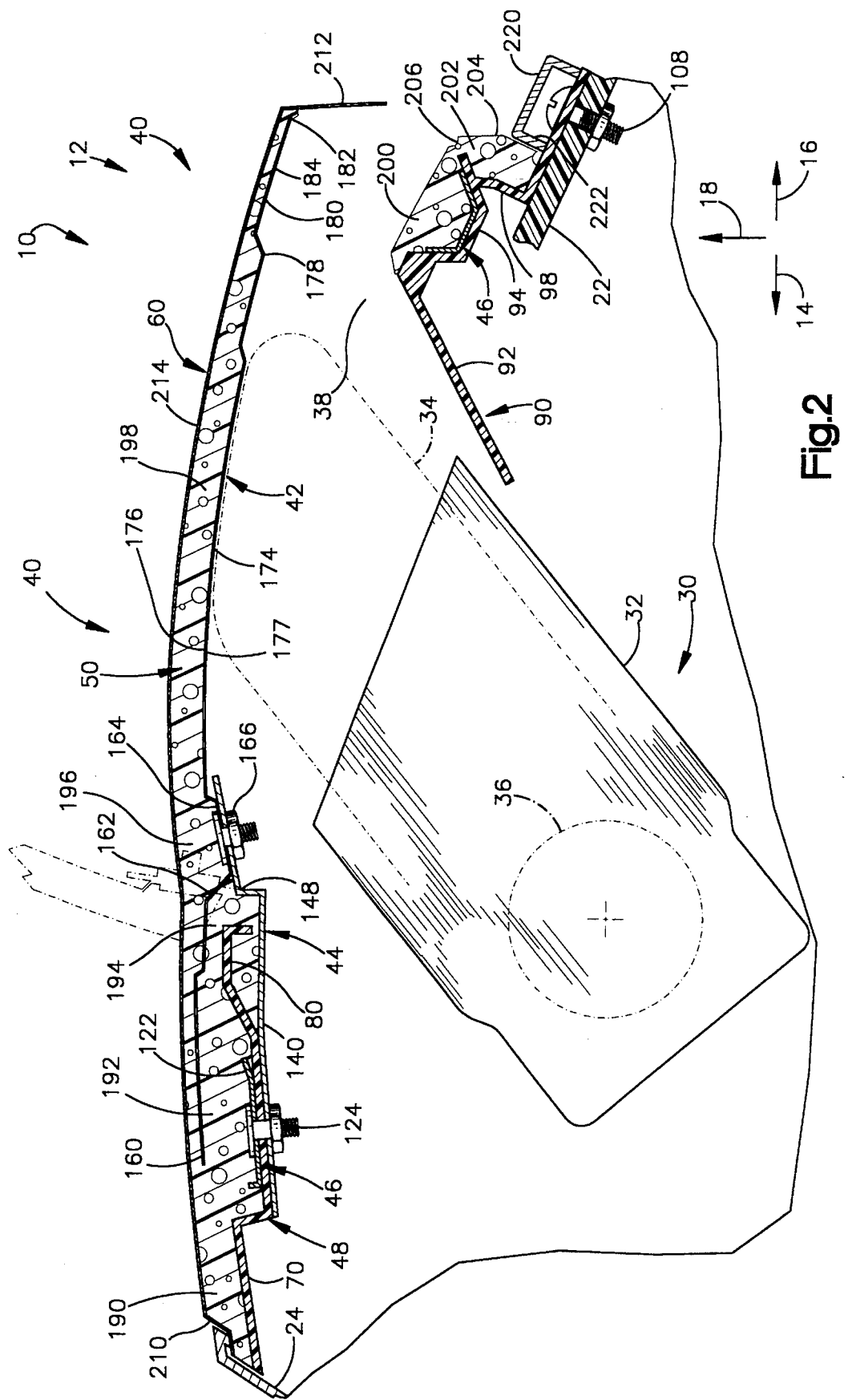
FIG. 2 is a view similar to FIG. 1 showing the door assembly in a partially opened condition.

In the event of a vehicle collision requiring air bag inflation, the inflator 36 is actuated in a known manner by a collision sensor (not shown). The inflator 36 directs inflation fluid into the air bag 34. The air bag 34 inflates from the stored and folded condition to an inflated condition to restrain the vehicle occupant. FIG. 2 illustrates the position of the air bag 34 and of the door assembly 40 at an early stage during inflation and deployment of the air bag, in which the door assembly 40 is partially open.

The inflating air bag 34 as illustrated in FIG. 2 is in engagement with the lower side surface 177 of the main body portion 174 of the door panel 42. The force of the inflating air bag 34 is transmitted through the door panel 42 into the portion 198 of the body of foam material 50 and into the skin portion 214. The force of the inflating air bag 34 attempts to pivot the door panel 42 to an open position. Movement of the door panel 42 from the closed condition illustrated in FIG. 1 toward the partially open condition illustrated in FIG. 2 is resisted, along the three non-hinged sides of the door assembly 40, by (a) the adhesion between the foam portion 200 and the lower side surface 184 of the rear edge portion 180 of the door panel 42, and (b) the adhesion between the foam portion 202 and the terminal end portion 212 of the skin 60, and (c) the resistance to breaking of the body of foam material 50 at the area 206.

When the amount of force exerted on the door panel 42 by the inflating air bag 34 exceeds a predetermined amount, the terminal end portion 212 of the skin 60 is pulled by the skin portion 214 away from the body of foam material 50. The terminal end portion 212 of the skin 60 peels away from the portion 202 of the body of foam material 50 along all three sides of the deployment opening 38 not occupied by the hinge 44. At the same time, the rear edge portion 180 of the door panel 42 pulls away from the portion 200 of the body of foam material 50, along all three sides of the deployment opening 38 not occupied by the hinge 44.

Also, at the same time, the force of the inflating air bag 34 breaks the body of foam material 50 at the frangible area 206, along all three sides of the deployment opening 38 not occupied by the hinge 44. The foam 50 might break anywhere in the area 206 near the tip 182 of the door panel 42. When the body of foam material 50 breaks at the frangible area 206, the foam portion 198 separates from the foam portions 200 and 202. The main body portion 174 of the door panel 42, the foam portion 198, and the skin portions 214 and 212 all move to the open position. The foam portions 200 and 202 remain in position on the substrate 48 and the frame 46.

The force of the inflating air bag 34 causes the hinge portion 162 of the door panel 42 to bend from the condition shown in FIG. 1 to the condition shown in FIG. 2. The third portion 146 of the hinge 44 pivots relative to the second portion 142 in a counterclockwise direction as viewed in FIG. 1 about the bend line 148. The foam portion 194 surrounding the hinge portion 162 of the door panel 42 deforms as the hinge 44 bends at the bend line 148. The skin 60 also bends or flexes at this area. The door assembly 40 moves from the closed position shown in FIG. 1 through the partially open position shown in FIG. 2 to a fully open position as partially illustrated in dot-dash lines in FIG. 2. The air bag 34 inflates and deploys through the opening 38 in the vehicle instrument panel 20 to restrain the vehicle occupant.

From the above description of the invention, those skilled in the art will perceive improvements, changes and modifications in the invention. For example, the terminal end portion 212 of the skin 60 may extend under the inner leg 222 of the trim piece 220, as indicated in dot dash lines in FIG. 4. Such improvements, changes and modifications within the skill of the art are intended to be covered by the appended claims.

Having described the invention, we claim:

1. An apparatus for covering an opening through which an inflatable vehicle occupant restraint is deployed, said apparatus comprising:

a body of foam material;

a skin covering said body of foam material;

support means for supporting said body of foam material and said skin in a first position covering said opening;

hinge means at a first side of said body of foam material for supporting a first portion of said body of foam material for pivoting movement from the first position in response to deployment of the inflatable restraint;

said skin having a terminal end portion at a second side of said body of foam material opposite said first side;

said terminal end portion of said skin having an inner side surface which is in engagement with and which is releasably bonded to an outer side surface of a second portion of said body of foam material; and means for peeling said inner side surface of said terminal end portion of said skin out of engagement with and away from said outer side surface of said second portion of said body of foam material upon deployment of the inflatable restraint.

2. An apparatus as set forth in claim 1 wherein said means for peeling comprises a door panel connected with said hinge means and movable with said first portion of said body of foam material from the first position, said door panel having a first major side surface against which the inflatable restraint acts upon deployment of the inflatable restraint and a second major side surface in engagement with said first portion of said body of foam material.

3. An apparatus as set forth in claim 2 wherein said door panel includes an edge portion having an inner side surface in engagement with and releasably bonded to an outer side surface of a third portion of said body of foam material, said inner side surface of said edge portion of said door panel peeling out of engagement with and away from said outer side surface of said third portion of said body of foam material upon deployment of the inflatable restraint.

4. An apparatus as set forth in claim 1 comprising a frangible portion of said body of foam material interconnecting said first and second portions of said body of foam material, said frangible portion of said body of foam material being frangible in response to deployment of the inflatable restraint to enable separation of said first portion of said body of foam material from said second portion of said body of foam material.

5. An apparatus as set forth in claim 1 wherein said means for peeling comprises a rigid member which is located adjacent to a surface of said body of foam material opposite said skin, said rigid member having a portion which is embedded in said body of foam material between said first and second portions of foam material.

6. An apparatus as set forth in claim 5 wherein said rigid member includes an edge portion having an inner side surface in engagement with and releasably bonded to an outer side surface of a third portion of said body of foam material, said inner side surface of said edge portion of said rigid member peeling out of engagement with and away from said outer side surface of said third portion of said body of foam material upon deployment of the inflatable restraint.

7. An apparatus as set forth in claim 1 comprising means for blocking movement of said second portion of said body of foam material when said first portion of said body of foam material moves from the first position upon deployment of the inflatable restraint.

8. An apparatus comprising:

an inflatable vehicle occupant restraint for, when inflated, restraining an occupant of a vehicle, said inflatable restraint having an uninflated condition and an inflated condition;

an inflator for, when actuated, inflating the inflatable restraint;

means for supporting said inflator and said inflatable restraint on the vehicle; and a door assembly having a closed condition when said inflatable restraint is in the uninflated condition and an open condition to which said door assembly is moved upon deployment of said inflatable restraint, said door assembly comprising:

a frame and means for supporting said frame on the vehicle;

a door panel;

a hinge connected with a first side portion of said door panel and supporting said door panel on said frame for pivotal movement relative to said frame between a closed position and an open position;

a body of foam material having a first portion fixed for movement with said door panel between the closed position and the open position and a second portion supported on said frame, said second portion having an outer side surface; and a skin having a first portion overlying said first portion of said body of foam material on said door panel and a second portion which has an inner side surface in engagement with said outer side surface of said second portion of said body of foam material;

said first portion of said skin being movable with said first portion of said body of foam material between the closed position and the open position;

said inner side surface of said second portion of said skin peeling out of engagement with and away from said outer side surface of said second portion of said body of foam material when said first portion of said skin moves between the closed position and the open position.

9. An apparatus as set forth in claim 8 wherein said inner side surface of said second portion of said skin is releasably bonded to said outer side surface of said second portion of said body of foam material when said door assembly is in the closed condition.

10. An apparatus as set forth in claim 8 wherein said door panel has first and second opposite major side surfaces, said first portion of said body of foam material overlying said first major side surface of said door panel, said door panel being engageable by said inflatable restraint upon inflation of said inflatable restraint to move said door panel toward the open position, said first-portion of said skin pulling said second portion of said skin from said second portion of said body of foam material in response to movement of said door panel toward the open position.

11. An apparatus as set forth in claim 8 wherein said door panel includes an edge portion having an inner side surface, said inner side surface of said edge portion of said door panel being in engagement with and being releasably bonded to an outer side surface of a third portion of said body of foam material, said inner side surface of said edge portion of said door panel peeling out of engagement with and away from said outer side surface of said third portion of said body of foam material upon deployment of said inflatable restraint.

12. An apparatus as set forth in claim 8 comprising a frangible portion of said body of foam material interconnecting said first and second portions of said body of foam material, said frangible portion of said body of foam material breaking in response to deployment of said inflatable vehicle occupant restraint to enable separation of said first portion of said body of foam material from said second portion of said body of foam material.

13. An apparatus as set forth in claim 8 wherein said second portion of said body of foam material remains supported on said frame when said first portion of said body of foam material moves between the closed position and the open position.

* * * * *